No. 625,392. Patented May 23, 1899.
L. VON GRAVE.
CAMERA BASE.
(Application filed Feb. 23, 1899.)
(No Model.) 2 Sheets—Sheet 1.

WITNESSES

INVENTOR:
Lothar von Grave,
BY
ATTORNEY

No. 625,392. Patented May 23, 1899.
L. VON GRAVE.
CAMERA BASE.
(Application filed Feb. 23, 1899.)
(No Model.) 2 Sheets—Sheet 2.
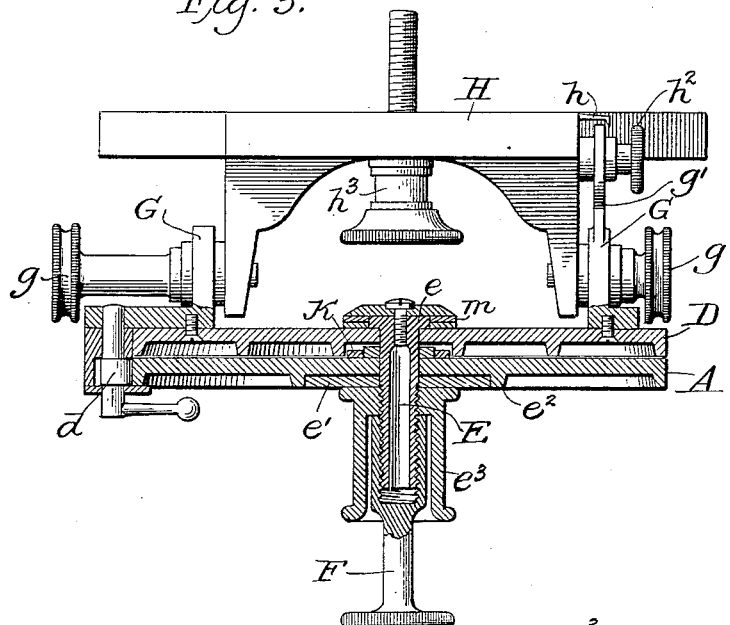
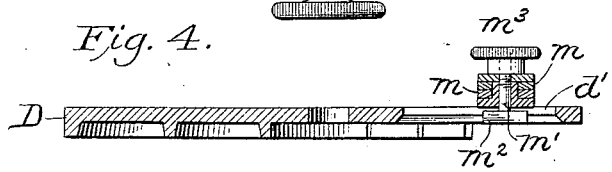
WITNESSES
INVENTOR:
Lothar von Grave,
BY
ATTORNEY

United States Patent Office.

LOTHAR VON GRAVE, OF WALLINGFORD, CONNECTICUT, ASSIGNOR OF ONE-THIRD TO GEORGE C. WALDO, OF MOUNT VERNON, NEW YORK.

CAMERA-BASE.

SPECIFICATION forming part of Letters Patent No. 625,392, dated May 23, 1899.

Application filed February 23, 1899. Serial No. 706,462. (No model.)

*To all whom it may concern:*

Be it known that I, LOTHAR VON GRAVE, a subject of the King of Prussia, German Emperor, residing at Wallingford, county of New Haven, State of Connecticut, have invented certain new and useful Improvements in Camera-Bases, of which the following is a full, clear, and exact description.

My invention relates to improvements in camera-bases; and my object is to improve the construction of the same.

In taking panoramic views with an ordinary camera difficulty has been experienced in getting the edges of the different views to exactly join. By my invention, however, I provide a camera-base which has a carriage pivoted thereto so that it can be swung around to take a view in any direction, together with stops which may be fixed relatively to a stationary part and to the carriage, so that the camera may be fixed in one position and a view taken and the camera then swung to one direction or the other until the stops contact with each other. If a picture is then taken with the camera in this adjusted position, it will be found that the edges of the two views taken will exactly join.

Figure 1:
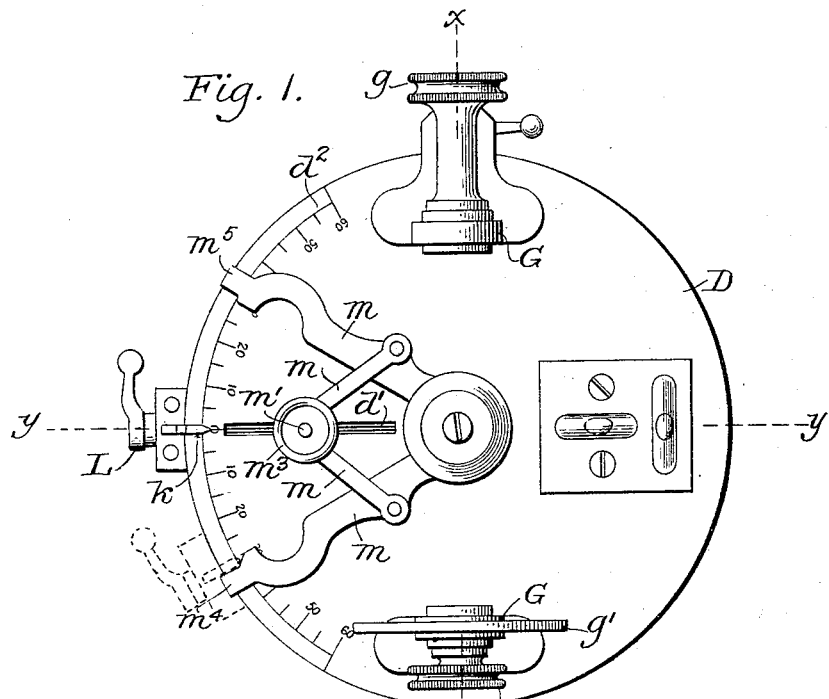
Figure 2:
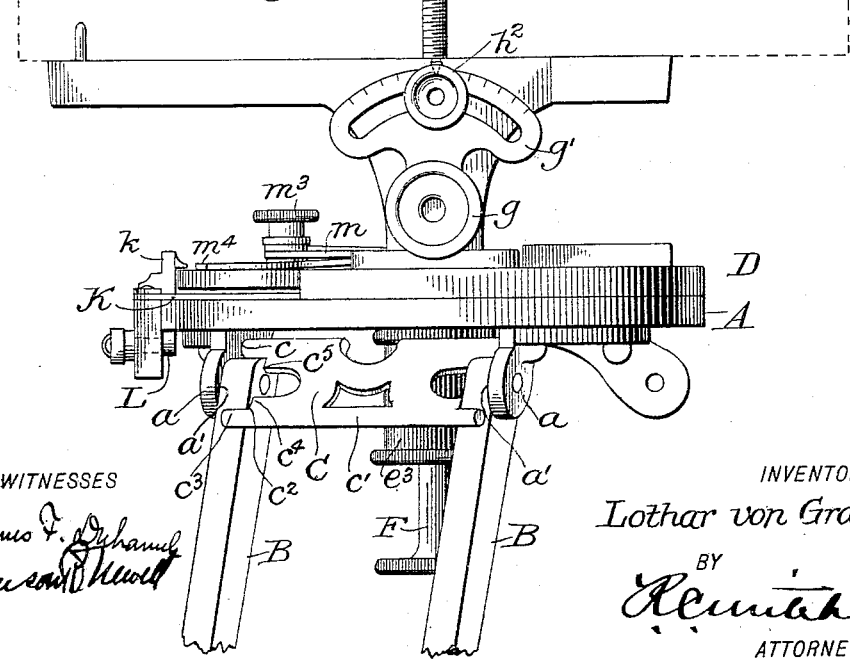

In the preferred embodiment of my invention shown in the drawings, Figure 1 represents a plan view of my carriage; Fig. 2, a side elevation thereof; Fig. 3, a vertical section of a portion of the same on the line X X of Fig. 1. Fig. 4 represents a detail of a sectional view on the line Y Y of Fig. 1.

In the accompanying drawings, A represents a relatively stationary part or base having depending ears $a$ $a$, which have substantially perpendicular sides $a'$ $a'$ facing each other, and to these ears are pivoted legs B B, which rest against these faces.

C is a lock pivoted at $c$, so that the front $c'$ will drop by gravity into the position shown. The part $c'$ has a shoulder $c^2$, one part of which, $c^3$, rests against the legs when the catch is dropped into position, and the other part, $c^4$, of which passes between the legs and prevents their disengagement from the ears.

$c^5$ is virtually an extension of the part $c^4$.

D is the revolving plate of a carriage, through which and the stationary part passes a pivot-pin E, having a head $e$ above the plate and screw-threaded at its lower end below the stationary part.

$d$ is a clamp consisting of a cam-face pivoted to the plate D and adapted to be rotated so as to bring its face into contact with the part A and lock said carriage and stationary part together.

$e'$ is a disk surrounding the pivot E and preferably held in the depression formed by the ring $e^2$ on the under side of the stationary part.

$e^3$ is a locking-thimble screwing upon the pivot E and serving to lock the stationary part and the carriage together. F is a lock for this thimble.

G G are lugs carried by the plate D, through which pass screws $g$ $g$, forming pivots for a camera-support H. One of the lugs G carries a slotted scale $g'$, over which moves an indicator $h$ on the support H. $h^2$ is a clamp to fix said support in position relatively to said scale and plate D.

Pivoted to the pin E is an arm K, carrying a stop $k$, projecting above and over the plate D.

L is a cam-clamp carried by the arm K and adapted to contact with the under face of the stationary part A and lock the arm K, and consequently stop $k$, to said stationary part in a manner similar to that of the clamp $d$.

M M are arms through one end of each of which passes the pivot-pin E, and these arms form at their ends stops $m^4$ $m^5$, which are circumferentially movable around this pivot. It will be obvious that these stops need not necessarily move in the arc of a circle around this pivot, and by "circumferentially" I do not mean that they must necessarily move in such an arc; but by this word I mean laterally of a radius from the pivot on which said carriage swings.

$m$ $m$ are links of equal length pivoted to the arms M, as shown, and also pivoted together by a pin $m'$, passing through a radial slot $d'$ in the plate D, having a head $m^2$ below said plate. $m^3$ is a nut screwed upon the threaded end of $m'$ to clamp these arms $m$ $m$ in position in respect to said slot, and therefore hold arms M, and consequently stops $m^4$ $m^5$, in position.

A scale $d^2$ is shown on plate D, preferably numbered in opposite directions from some center point thereon, as shown. The slot $d'$ preferably extends from the pivot E radially outward toward this center point, and consequently as $m'$ is moved in one direction or the other the links $m$ and arms M, and consequently stops $m^4 m^5$, will be moved in one direction or the other at equal angular speeds, and the stops $m^4$ will be moved equal distances in opposite directions from the zero-point on said scale.

The operation of the device is as follows: The camera having been placed upon the support H and fixed thereto by the screw $h^3$, the camera is adjusted into position, so that one end of the panoramic view desired is just within the field of the lens. If the angle of the lens used is sixty degrees, it will be obvious that after the first picture is taken the camera should be moved sixty degrees in one direction or the other, so that when the next picture is taken the edges of the two views will exactly join. To accomplish this result, the nut $m^3$ is loosened and $m'$ moved in one direction or the other in the slot until the stops $m^4 m^5$ stand sixty degrees apart—that is, thirty degrees in each direction from the zero-point on the scale, as shown. The nut $m^3$ is then tightened, fixing the stops in this position. The clamp L is then moved until the stop $k$ abuts against stop $m^4$, as shown in dotted lines in Fig. 1, if the succession of the pictures in the panoramic view is to be taken from right to left, and said clamp is then turned, locking this stop $k$ in position with reference to stationary part A. The picture is then taken, and when the next view is ready to be taken it is only necessary to release clamp $d$ and swing the carriage from right to left in Fig. 1 until the stop $m^5$ comes into contact with stop $k$. The camera will then have been moved exactly sixty degrees or the angle of the lens, and if the carriage is then fixed in this position by the clamp $d$ a picture taken at this position will have its edge exactly join the edge of the first picture. The clamp L may then be released, moving stop $k$ until it again abuts against stop $m^4$ and the foregoing operation be repeated. In this way any number of panoramic views may be taken, the edges of each corresponding with the edges of the adjacent ones without necessitating moving the legs of the tripod.

It will be obvious that very many changes may be made in the embodiment herein disclosed without departing from the spirit of my invention.

What I claim is—

1. In a camera-base in combination a relatively stationary part, a carriage for the camera pivoted thereto a stop adjustable entirely around said stationary part and provided with means to lock it to said stationary part, and a stop carried by said carriage said stops adapted to contact with each other as said carriage is swung about said pivot.

2. In a camera-base in combination a relatively stationary part, a carriage for the camera pivoted thereto, a lock between said stationary part and carriage, a stop adjustable entirely around said pivot, a lock between said stop and stationary part, a stop carried by said carriage and movable circumferentially of the pivot of said carriage, a lock between said stop and carriage said stops adapted to contact with each other when said carriage is swung about said pivot.

3. In a camera-base in combination a relatively stationary part, a carriage for the camera pivoted thereto a lock between said stationary part and carriage, a stop adjustable circumferentially of said pivot and also of said stationary part, means to lock said stop and stationary part together, a plurality of stops carried by said carriage, means whereby said plurality of stops may be adjusted in opposite directions and means to fix said stops in position on said carriage, said stops on said carriage adapted to contact with said stop on said stationary part as said carriage is swung about said pivot.

4. In a camera-base in combination a relatively stationary part, a carriage for the camera pivoted thereto a lock between the same, a stop adjustable substantially circumferentially of said stationary part and of said carriage, means to fix said stop with relation to said stationary part and a stop carried by said carriage and adjustable relatively thereto and to said stationary part, said stops adapted to contact with each other when said carriage is swung about said pivot.

5. In a camera-base in combination a relatively stationary bed-plate, a carriage for the camera, a pivot connection between the same, means to clamp said bed-plate and carriage together, a stop rotatable around said pivot, a lock between said stationary part and stop, a scale on said carriage, a pair of arms movable around said pivot relatively to said carriage, one of the same passing over said scale, said arms carrying stops adapted to contact with said other stop when said carriage is swung on said pivot, means to move said arms in opposite directions and at the same angular speed, and a clamp between said arms and carriage.

6. In a camera-base in combination a relatively stationary bed-plate, a carriage for the camera, a pivotal connection between the same, means to clamp said bed-plate and carriage together, a stop rotatable around said pivot, a lock between said stationary part and stop, a scale on said carriage, a pair of arms movable around said pivot relatively to said carriage, one of the same passing over said scale, said arms carrying stops adapted to contact with said other stop when said carriage is swung on said pivot, means to move said arms in opposite directions and at the same angular speed, embracing a pair of links of equal length each connected at one end to one of said arms and a guide for the other ends of said arms extending radially from said pivot, and a clamp between said arms and carriage.

7. In a camera-base in combination, a slotted plate, a pair of arms pivoted together and movable over said plate, a scale carried by said plate, said scale being located under the path of movement of said arms, a pair of links of the same length each pivoted at one end to one of said arms, a threaded pivot passing through the other ends of said arms and through said slot in said plate and movable therein, said slot extending radially of the pivot of said arms and toward said scale, said scale being graduated in opposite directions from said slot, and means to fix said arms immovably in position with relation to said slot.

8. In combination a base, ears on the under side of said base said ears having sides facing each other and legs pivoted to said ears, and a pivot-lock adapted to fall by gravity said lock having shoulders one part of which contacts with said legs and the other part of which passes and rests between said legs to lock said legs from disengagement from said ears.

Signed at Wallingford, Connecticut, this 30th day of January, 1899.

LOTHAR VON GRAVE.

Witnesses:
RUDOLF WAGNER,
WILLIAM F. GEIGER.